US012179376B2

(12) United States Patent
Grasselli

(10) Patent No.: US 12,179,376 B2
(45) Date of Patent: Dec. 31, 2024

(54) SAFETY SYSTEM

(71) Applicant: GRASSELLI S.P.A., Albinea (IT)

(72) Inventor: Graziano Grasselli, Reggio Emilia (IT)

(73) Assignee: GRASSELLI S.P.A.

( * ) Notice: Subject to any disclaimer, the term of this patent is extended or adjusted under 35 U.S.C. 154(b) by 373 days.

(21) Appl. No.: 17/701,118

(22) Filed: Mar. 22, 2022

(65) Prior Publication Data

US 2022/0305689 A1    Sep. 29, 2022

(30) Foreign Application Priority Data

Mar. 24, 2021    (IT) .................... 102021000007103

(51) Int. Cl.
*B26D 7/24* (2006.01)
*F16P 3/12* (2006.01)

(52) U.S. Cl.
CPC . *B26D 7/24* (2013.01); *F16P 3/12* (2013.01)

(58) Field of Classification Search
CPC .... B26D 7/24; B26D 7/22; B26D 1/46; F16P 3/12; F16P 7/02; A22B 5/0017; A22B 5/208; A22C 17/0006; G05B 19/4061; G05B 2219/49152; G05B 2219/45044; G05B 2219/49159; B27B 13/16; B27B 13/14; B27G 21/00; B27G 19/06; B27G 19/02; B27G 19/00; B23D 55/00; B23D 59/001; Y10T 83/7083; Y10T 83/081; Y10T 83/089
USPC .... 83/62, 58, 62.1, 788, 790, 471, 490, 581, 83/471.1, 477.2, 610, 820, 829, 793, 792
See application file for complete search history.

(56) References Cited

U.S. PATENT DOCUMENTS

| 2,140,338 | A  | * | 12/1938 | Temple, Jr. ............ H02G 1/005 83/639.4 |
| 6,000,311 | A  | * | 12/1999 | Katoh ...................... G21C 9/00 83/639.4 |
| 7,290,474 | B2 | * | 11/2007 | Keller ..................... F16P 3/148 83/639.4 |
| 7,621,205 | B2 | * | 11/2009 | Gass .................. G05B 19/4061 83/788 |
| 8,534,174 | B2 | * | 9/2013  | Kajita .................... B27G 19/02 89/7 |
| 8,593,295 | B2 |   | 11/2013 | Grasselli et al. |
| 8,941,494 | B2 |   | 1/2015  | Santini et al. |
| 10,051,870 | B2 |  | 8/2018  | Grasselli |
| 2002/0170400 | A1 | | 11/2002 | Gass |
| 2006/0000337 | A1 | | 1/2006  | Gass |
| 2011/0084847 | A1 | | 4/2011  | Grasselli et al. |
| 2014/0043161 | A1 | | 2/2014  | Santini et al. |
| 2017/0334087 | A1 | * | 11/2017 | Gass ...................... F16P 3/147 |

(Continued)

FOREIGN PATENT DOCUMENTS

| EP | 2312195 A2 | 4/2011 |
| EP | 2696125 A1 | 2/2014 |

(Continued)

*Primary Examiner* — Ghassem Alie
(74) *Attorney, Agent, or Firm* — CHRISMAN GALLO TOCHTROP, LLP

(57) ABSTRACT

The safety system for a machine (1), provided with a blade (12), comprises: means (2) for detecting a dangerous condition for the safety of an operator; and a cutting-off apparatus (2) adapted to cut off the blade (12), following the detection of the dangerous condition.

16 Claims, 7 Drawing Sheets

(56) References Cited

U.S. PATENT DOCUMENTS

2018/0098550 A1 4/2018 Grasselli
2018/0210419 A1 7/2018 Gass

FOREIGN PATENT DOCUMENTS

EP 3309440 A1 4/2018
WO 2020178748 A1 9/2020

* cited by examiner

SAFETY SYSTEM

The present invention relates to a safety system for a machine provided with a blade, such as, by way of non-exhaustive example, a machine for cutting meat, specially intended to cut meat with a bone, of the type also known as a "band saw" or "bone saw".

Bone-sawing machines are known that are used in particular in the meat industry but also in butcher's shops, fishmonger's shops, restaurants, canteens, etc.

These machines use flexible blades provided with a cutting edge.

In detail, known machines comprise two pulleys, one of which is motorised, around which the blade is wound in a closed loop.

In use, the operator activates the motor of the machine, rests the product to be cut on a special support plane and pushes the product against the cutting edge of the blade.

In this manner, the blade traverses the product from one side to another, in a direction that is transverse to the bone.

The operation is repeated until a plurality of slices is obtained from the initial product, each comprising a portion of bone, like chops, T-bone steaks, etc.

As the cut is performed manually, one of the biggest concerns of user companies and of manufacturers of this type of machine is the safety of operators, especially the integrity of their hands.

Currently, machines are present on the market that are provided with safety systems so as to avoid operators getting injured during use of the machine or at least reduce harm done as far as possible.

Nevertheless, known machines that use such safety systems are not free of limits and defects.

In fact, prior-art systems are based on the idea of braking the blade of the machine that, in use, is dragged by the motorised pulley at very high speed.

To be precise, machines are currently offered on the market with two different safety systems.

A first safety system is so devised that in response to the detection of a dangerous condition, the blade is slowed gradually, whereas the second type of safety system is devised to block the blade instantaneously.

The limit of the first type of system is that before the blade stops completely it is possible that it has the time to cause very serious injuries to the operator, which may also go as far as amputation of the fingers or opening very deep cuts in the hands.

The great limit of the second type of safety system consists of the fact that the almost immediate block of the blade is possible only by compromising structurally the kinematic mechanisms used to actuate the blade, which results in the machine being put out of service, the machine having to be repaired before being used again.

The technical task underlying the present invention is thus to propose a machine for cutting meat which overcomes the limits of the prior art. This technical task is attained by the invention made according to the appended claims.

Further characteristics and advantages of the present invention will become more apparent from the following indicative, and therefore non-limiting, description of preferred, but not exclusive, embodiments of the security system of the invention, as illustrated in the accompanying drawings, in which.

With reference to the mentioned figures, 1 indicates a machine for cutting meat, which is specially designed for professional use and is preferably usable for cutting meat with bone, which represents a type of machine to which the invention is applicable.

In detail, the invention relates to an improved safety system, which is applicable to a machine that is provided with a blade and is thus dangerous for the safety of an operator.

In the following, reference will be made, by way of example and without loss of generality, to the case in which the safety system is applied to the machine 1 shown, i.e. a so-called "bone saw" machine, a "band saw.

Figure 1:
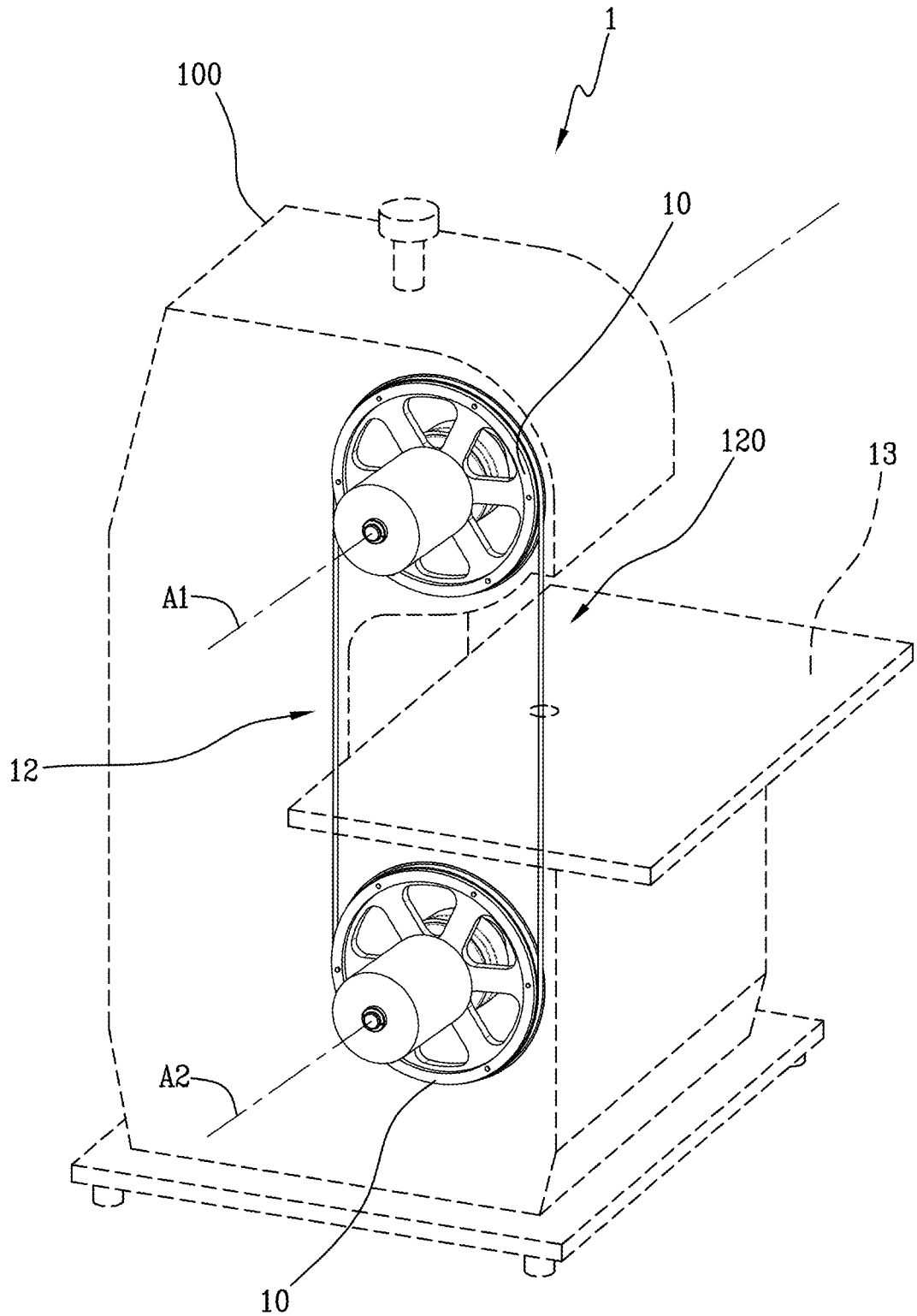
FIG. 1 is an axonometric view of a machine to which the proposed system can be applied, in which the casing is shown in a transparent view and in a stylised manner.
Figure 2:
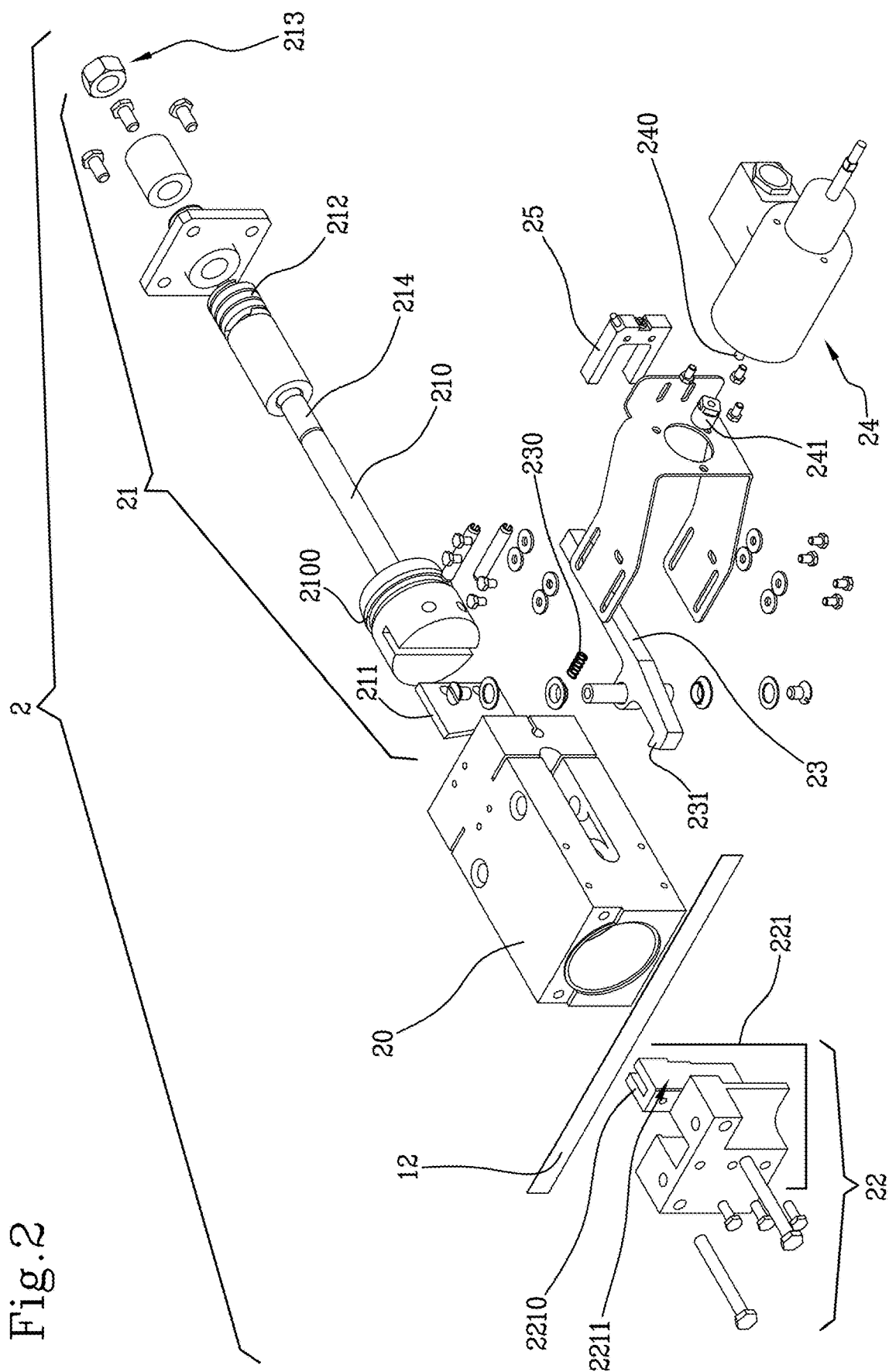
FIG. 2 is an exploded view of a cutting-off apparatus that is used to cut off the blade of the machine if an event occurs that is dangerous to the safety of the operator.

The machine 1 includes transmissions 10, preferentially consisting of two pulleys 10 arranged on top of one another with rotation axes A1, A2 that are horizontal and preferably placed on the same vertical plane, around which the cutting blade 12, consisting of a flexible steel belt, is closed in a loop (see FIG. 1). The two suitably spaced apart pulleys 10 also perform the function of tensioning the blade 12 so that it can cut the meat with bone effectively.

At least one of the two pulleys 10 is motorised and drags the blade 12 in rotation; preferably it is the lower pulley.

Like known machines, also the machine of the invention includes a containment casing 100 that comprises, in addition to the pulleys 10, to the blade 12 and to the motor (not shown), also a frame for supporting the movable or fixed components of the invention.

The casing 100 preferably covers the blade 12 apart from a vertical branch 120 of the aforesaid ring, which defines the cutting space.

The casing 100 is also provided with a support plane 13 that limits below the aforesaid uncovered branch 120 and is set up to support the product to be cut, which is pushed by hand by the operator against the edge of the blade 12, during use, according to methods that are in themselves known and are thus not elaborated on here.

As will be clear from the following description, the safety system of the invention is so devised that following detection of a dangerous condition, the blade 12 is immediately cut off so that it opens and leaves the cutting space, owing to the elasticity thereof and inertia of the dragging motion exerted by the transmissions 10.

The safety system of the invention, which is set up to prevent or minimise the risk of injury to hands of the operator, above all includes means 2 for detecting a dangerous condition for the safety of an operator who is using the machine 1.

In practice, this means 2 is able to determine when a trigger event for the safety system occurs; this event corresponds substantially to the situation in which the hands of the operator are, or may be, at risk of injury.

Figure 7:
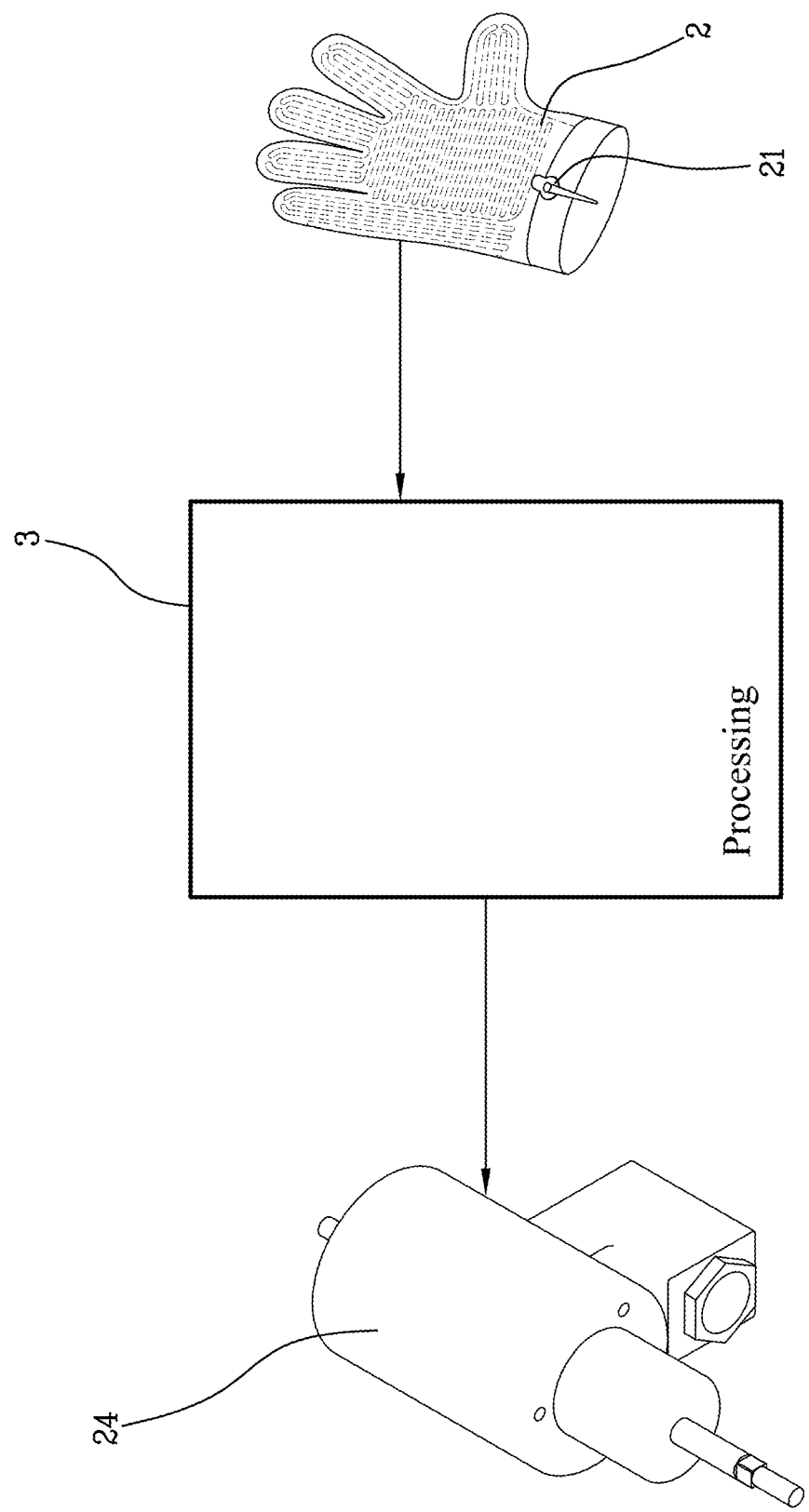
FIG. 7 is a schematic view of the processing unit of the invention.

The detection means preferentially includes two gloves 2 (one of which is shown by way of example in FIG. 7), provided to be worn by the operator, so configured that the safety system detects the aforesaid dangerous condition if the gloves 2 are affected by the blade 12 of the machine 1.

Such gloves 2 can be designed like those disclosed in European patent application No EP3309440 and/or in European patent No EP 2312195, in European patent No EP2696125 and/or in international patent application No WO 2020/178748 of the same applicant that are thus considered to be incorporated herein by reference to everything concerning the structure and operation of the patents.

In detail, an event that can be considered to correspond to the dangerous condition is the contact of the glove 2 with the blade 12 or a cut of the former caused by the latter.

For example, if the glove 2 comprises signal carrying means, interruption thereof because of the cutting by the blade 12 can constitute the trigger event that activates the safety system of the invention.

Also if these means are electric conductors, like wires or tracks printed on the surface of the glove, the short circuiting caused by simultaneous contact with the blade 12, which is made of conductive material, can still be an example trigger event.

In practice, a verification device can be provided that is associated with said gloves, set up to produce the danger signal when the gloves are affected by the blade 12.

It is not excluded that the invention may include detection means 2 that are different from the cited gloves, like for example gloves of different type or devices illustrated in different patent publications of the applicant or still other systems, regardless of whether they use optical, electrical, magnetic or sound technologies for detecting the dangerous condition, not excluding, to make an example, even the use of cameras or other means provided that they are suitable for the purpose.

The danger signal, or a signal produced downstream thereof, is then preferably received by a processing unit 3 that will be explained below.

The safety system then comprises a cutting-off apparatus 2 adapted to cut off the aforesaid blade 12 following the detection of said dangerous condition.

Preferably, the cutting-off apparatus 2 is located in the machine 1 below the support plane 13 and inside the casing 100 thereof.

In detail, a cutting-off apparatus 2 includes at least one first movable element 21, adapted to hit the blade 12 so as to be able to cut it. Preferably, the first element 21 includes a translating punch 210, adapted to slide longitudinally, so as to be able to intercept the blade 12. To be precise, the first movable element 21 includes also a cutting-off member 211, arranged at one end of the punch 210, which is able to cut the blade 12 when the cutting-off member 211 hits it on one side.

The cutting-off member 211 can consist of a metal plate, provided with a cutting edge, for example of trapezoidal shape or wedge-shape, fitted to the end of the punch 210 and facing the blade 12.

The punch 210 is so oriented that the cutting-off member 211 can hit a first side of the blade 12, along a transverse or, at the limit, oblique direction.

To be precise, the invention can include a rectilinear guide of the punch 210, for example obtained within the hollow body indicated by 20 in the figures.

Further, the cutting-off apparatus 2 can include a second abutting element 22 that is adapted to abut on the blade 12 at a second side thereof, i.e. in a position opposite the position in which the blade 12 is hit by the cutting-off member 211 carried by the punch 210 of the first movable element 21. Preferably, the second element 22 is fixed and includes a seat 2210, defined in a female abutting member 221, adapted to receive the aforesaid cutting-off member 211, which constitutes in this case the male component of the pair.

In practice, the blade 12 is cut immediately when gripped between the cutting-off member 211 and the abutting member 221.

In still further detail, the abutting member 221 can include one or more surfaces 2211 for abutting on a side of the blade 12, when the opposite side is hit by the cutting-off member 211; for example, the abutting member 221 can comprise one or more metal bodies, which have a central seat 2210, in which the cutting-off member 211 can be housed, bordered by two flat surfaces 2211 against which the side of the blade 12 that faces the abutting member 221 strikes.

The abutting member 221 and the punch 210 that is provided with a cutting-off member 211 can be placed at the same height, so that the second can slide horizontally in the direction of the first when a dangerous condition arises.

Further, the cutting-off apparatus 2 includes elastic means 212 to send the first movable element against the blade 12; in detail, the elastic means 212 are preferably elastic pushing means, consisting for example of a spiral spring 212, arranged at the end of the punch 210 opposite that in which the cutting-off member 211 is fitted.

Figure 4:
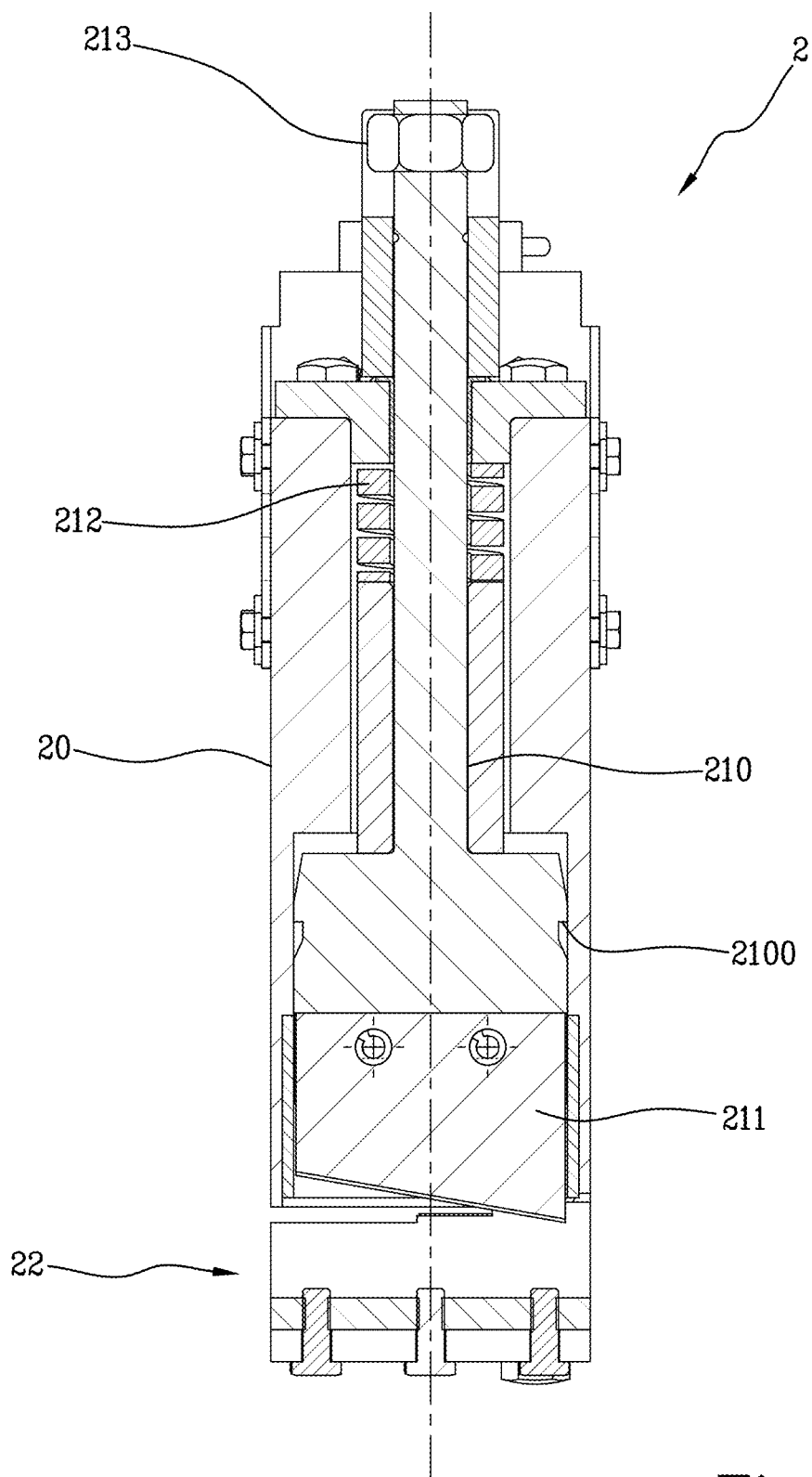
FIG. 4 is a section view of FIG. 3, taken along the plane A-A.
Figure 5:
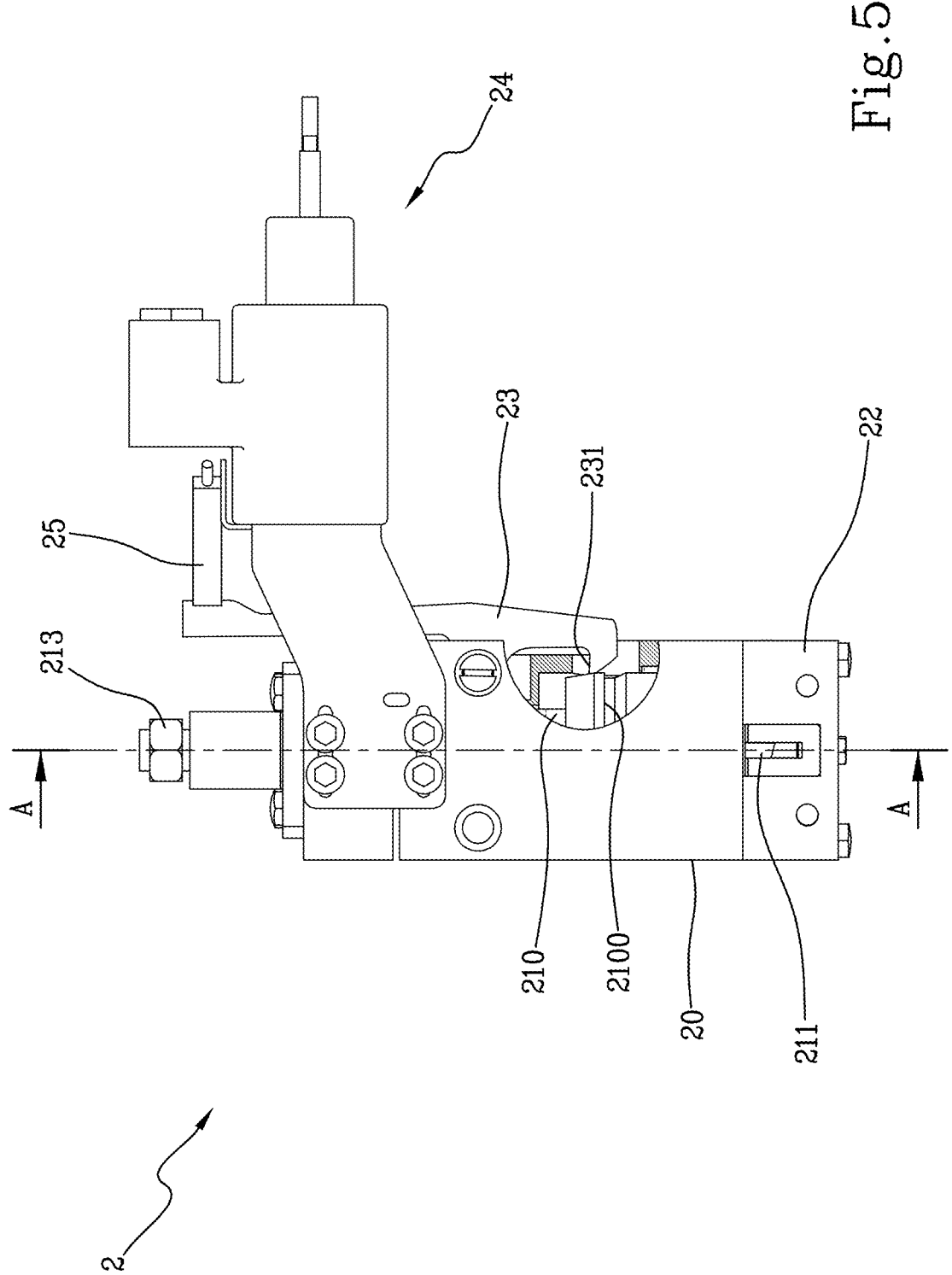
FIG. 5 is a lateral view of the apparatus of FIG. 2 in a triggering operating condition.
Figure 6:
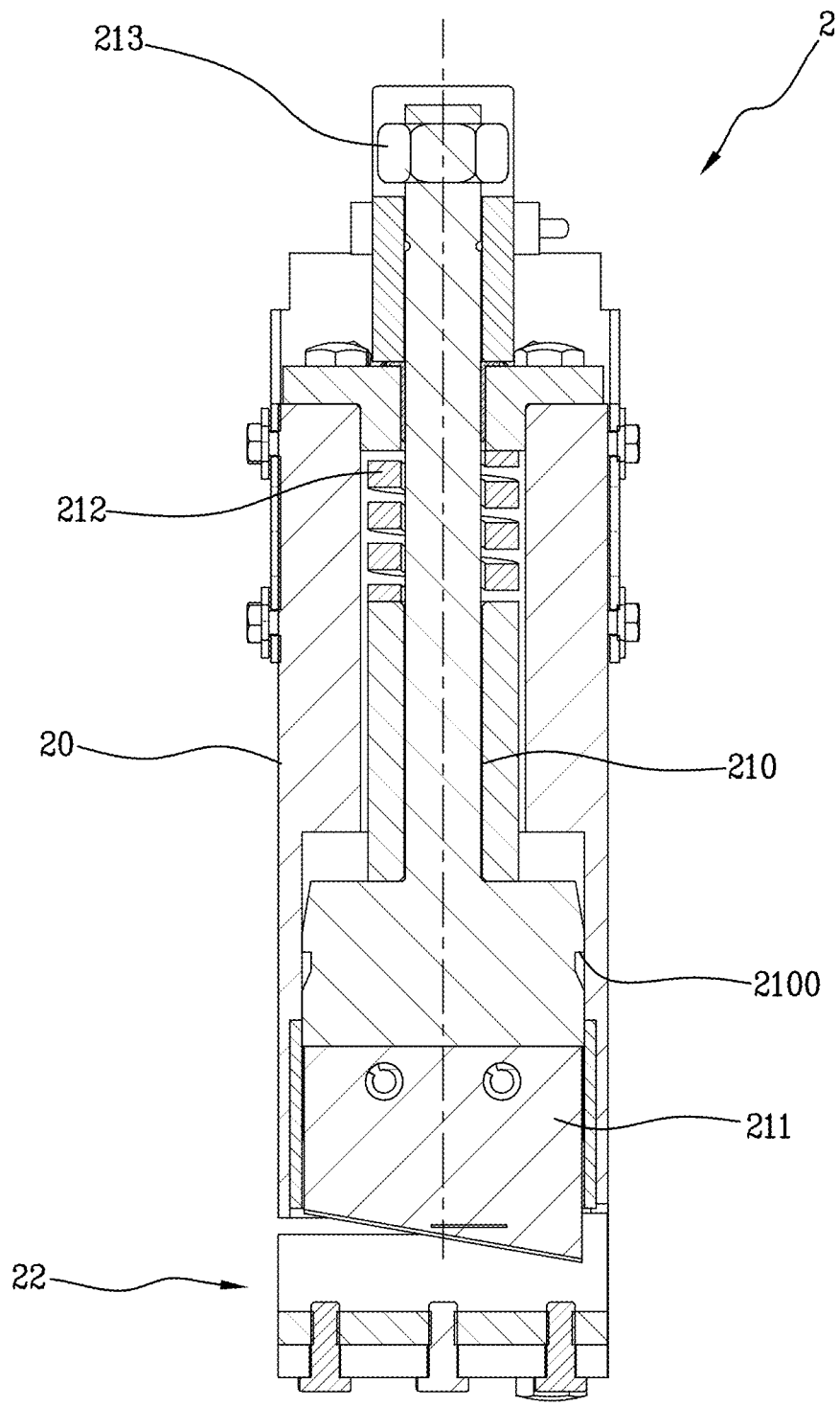
FIG. 6 is a section view of FIG. 5, taken along the plane A-A.

Advantageously, the cutting-off apparatus 2 can also include a trigger 23 adapted alternatively to retain the first movable element 21 in a loading position, wherein said elastic means 212 is preloaded (shown in FIGS. 3 and 4) or to release the cutting-off element (see FIGS. 5 and 6).

The reactivating means 213 is also provided to return the punch 210 to the loading position thereof once the latter has been freed and has caused cutting of the blade 12. This reactivating means can include a nut 23 that engages a thread 214 of the punch to enable the first element 21 to be returned manually to the aforesaid loading position.

Figure 3:
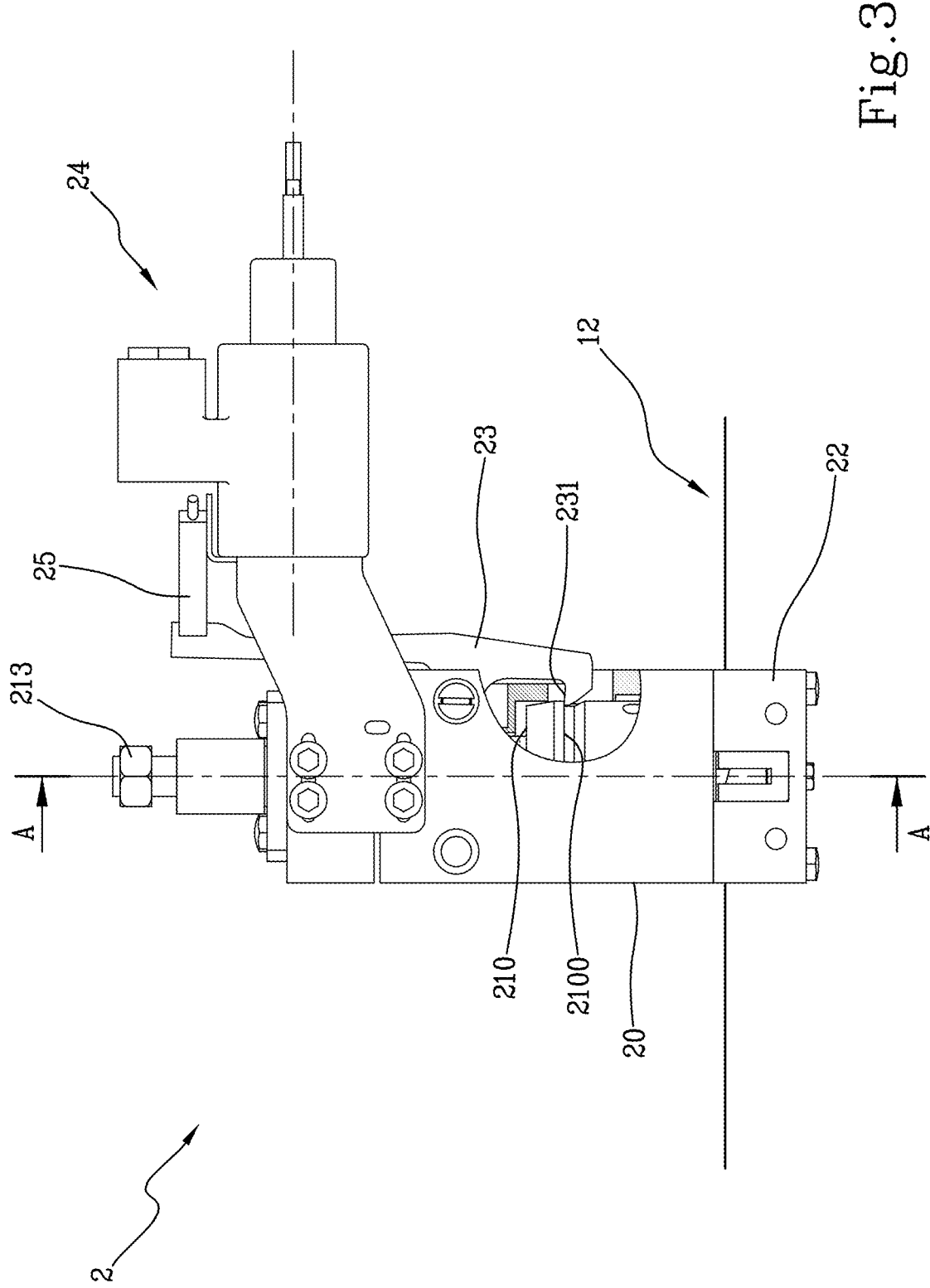
FIG. 3 is a side view of the apparatus of FIG. 2, in a rest operating condition.

The trigger 23 is rotatable relative to a pin so as to be able to oscillate between a gripping position and a release position, shown respectively in FIGS. 3 and 4 and in FIGS. 4 and 5. The trigger 23 can be normally maintained in the gripping position by elastic means 230, like for example a spiral spring. The trigger 23 forms a hook 231 that, in the aforesaid gripping position, is adapted to engage a gripping edge 2100 obtained on the punch 210, or anyway on the movable element 21, so as to retain the gripping edge 2100 in the respective aforesaid loading position. When the trigger 23 moves to the release position, the punch 210 is free to slide due to the thrust of the elastic means 212 thereof to the blade 12, so that the latter can be intercepted by the cutting-off member 211 and gripped between the latter and the aforesaid female abutting member 221.

The trigger 23 can reach the gripping edge 2100 of the punch by a slot obtained in the aforesaid hollow body 20, which connects the inner guide with the outer guide; this guide can be constituted by a rectilinear passage.

The cutting-off apparatus 2 further includes a triggering device 24 adapted to actuate the trigger 23, following receipt of a trigger signal. Preferably, the triggering device includes a solenoid valve 24 that comprises a movable stem 240, which can act on the trigger 23, overcoming the force of the aforesaid elastic means 230, so as to take it to the release position. Preferably, the stem 240 of the solenoid valve 24 bears a pad 241, intended to press on the trigger 23, which pad 241 is for example made of acetal resin.

Accordingly, when the solenoid valve 24 receives the trigger signal, it presses the trigger 23 that frees the punch 210, which jumps towards the blade 12 that is located between the cutting-off member 211 and the abutting member 221 and is then cut instantly.

It is not ruled out that the triggering device may be of electromechanical or electropneumatic type rather than including the aforesaid solenoid valve.

Further, a position sensor 25 is provided that is connected to the processing unit 3 and adapted to detect whether the trigger 23 is located in the gripping position or the release position.

More precisely, the position sensor 25 checks that the trigger is located in the gripping position, to permit the machine 1 to be started. In this manner, it is completely avoided that the machine is started when the punch 210 is not primed. Accordingly, the position sensor 25 is connected to the processing unit 3, which is configured to inhibit the start of the machine, in detail of the motor, following receipt of a signal by the sensor 25, represented by the fact that the trigger 23 is in a different position from the gripping position.

The functioning of the invention is disclosed below.

During use of the machine 1, the operator wears the aforesaid detecting gloves 2, that can for example be connected to the processing unit 3 by means of transceiving means 21 and, after starting up the motor of the machine 1, pushes repeatedly the product to be cut, for example pig ribs, along the support plane 13 where it meet the blade 12 that slides dragged by the pulleys 10 and thus cuts the product into pieces.

If the glove 2 comes into contact with the blade 12 or the trigger event anyway occurs that constitutes the dangerous condition, the danger signal is sent to the processing unit 3 that, after recognising the danger signal, produces a trigger signal that activates the solenoid valve 24, which presses the trigger 23, thus tripping the punch 210 towards the blade 12.

In this manner, the blade 12 is cut immediately that opens and frees the cutting zone, so as to prevent or at least minimise possible harm done to the hands of the operator.

After which, the casing of the machine 1 is opened, the punch 210 is reactivated by the aforesaid nut 213 and the replaced blade 12. As the kinematic mechanisms of the machine 1 have not been damaged, unlike what happens with some prior-art machines and the cost of the blade 12 in itself is rather small, the advantages of the invention are clear in terms of cheapness and also efficiency, in view of the fact that the machine 1 will not have to be repaired. Further, by using the invention, the interruption of the cutting function of the blade 12 is much more rapid than what occurs with known systems, in which this function occurs by blocking the operation of the motor, thereby reducing the time in which the hand of the operator can remain in contact with the edge of the blade 12, eliminating or minimising the probability of harm to the hand. On the contrary, the fact that the motor continues to run, at least for a few seconds, following cutting off of the blade 12, accelerates the exit of the blade 12 from the cutting zone, decreasing even further the likelihood of harm to the hands of the operator.

The invention is also configured as a process for avoiding or minimising the risk of injury to an operator of a machine 1 provided with a blade 12, like for example a machine for cutting meat, with particular reference to the hands.

The proposed process envisages detecting a condition of danger for the safety of an operator; and, if this is ascertained, cutting off the blade 12 of the machine 1.

It should be noted that steps of the process of the invention can optionally correspond to the various functions of the system disclosed above, including those of the processing unit 3 or of other components.

In particular, the dangerous condition is caused by the fact that the hands or the gloves 2 worn on the hands of the operator are affected by the blade 12.

Lastly, it is pointed out that also the method ensures that, when the blade 12 is cut following the occurrence of a dangerous condition, activation of the pulleys 10 by the motor is not interrupted, at least for a set minimum time.

The invention claimed is:

1. A safety system for a machine provided with a blade, the system comprising:
    a glove configured to detect a condition of danger an operator; and
    a cutting-off apparatus adapted to cut off the blade following detection of said condition of danger;
    wherein the cutting-off apparatus includes a first movable element, a hollow body, and a trigger;
    wherein the hollow body is configured to guide the first movable element therein in a first direction; and
    wherein the trigger is configured to reach the first movable element through a slot in the hollow body, wherein the slot extends in a second direction, the first direction being perpendicular to the second direction.

2. The system according to claim 1, wherein the first movable element, is adapted to hit the blade.

3. The system according to claim 2, wherein said first movable element is adapted to hit the blade transversely on a first side of the blade.

4. The system according to claim 2, wherein the cutting-off apparatus includes a second element, adapted to abut the blade at a position opposite a position in which the blade is hit by the first movable element.

5. The system according to claim 4, wherein the second element is fixed.

6. The system according to claim 4, wherein the first movable element includes a cutting-off member adapted to be inserted into a seat of an abutting member of the second element.

7. The system according to claim 6, wherein the first movable element includes said cutting-off member and the second element includes the abutting member.

8. The system according to claim 2, wherein the cutting-off apparatus includes a spring configured to send the first movable element against the blade.

9. The system according to claim 8, wherein the trigger is adapted alternatively to retain the first movable element in a rest position wherein said spring is preloaded or to release the first movable element.

10. The system according to claim 9, wherein the cutting-off apparatus includes a triggering device adapted to actuate said trigger following receipt of a triggering signal.

11. The system according to claim 10, wherein said glove is adapted to produce a danger signal, and a processing unit is provided that is connected to said glove and is configured to receive said danger signal and consequently actuate the cutting-off apparatus, wherein said processing unit is adapted to emit said triggering signal, following receipt of said danger signal.

12. The system according to claim 10, wherein said triggering device includes an electromagnet.

13. The system according to claim 1, wherein said glove is adapted to produce a danger signal, and a processing unit is provided that is connected to said glove and is configured to receive said danger signal and consequently actuate the cutting-off apparatus.

14. The system according to claim 1, wherein the glove is wearable by an operator and a verification device associated with said glove is configured to produce a danger signal if the glove is affected by the blade.

15. A process for avoiding or minimizing a risk of injuring an operator of a machine provided with a blade and the safety system of claim 1, the process comprising the steps of:
    detecting the condition of danger for the operator; and
    cutting off the blade of the machine following detection of the condition of danger.

16. The process according to claim 15, wherein the condition of danger occurs when the glove, worn on a hand of the operator, is contacted by the blade.

\* \* \* \* \*